United States Patent
Lingan et al.

(10) Patent No.: US 12,355,643 B2
(45) Date of Patent: Jul. 8, 2025

(54) PERFORMANCE INDICATORS USEFUL FOR MONITORING THE OVERALL PERFORMANCE OF A DATA CENTER

(71) Applicant: HONEYWELL INTERNATIONAL INC., Charlotte, NC (US)

(72) Inventors: Magesh Lingan, Bangalore (IN); Devanshu Dugar, Kolkata (IN); Anwesh Nayak, Bangalore (IN); Blake Clark, Oakwood, GA (US); Jayaprakash Meruva, Bangalore (IN); Lucy Cummings, Atlanta, GA (US)

(73) Assignee: HONEYWELL INTERNATIONAL INC., Charlotte, NC (US)

( * ) Notice: Subject to any disclaimer, the term of this patent is extended or adjusted under 35 U.S.C. 154(b) by 169 days.

(21) Appl. No.: 18/446,169

(22) Filed: Aug. 8, 2023

(65) Prior Publication Data
US 2024/0056369 A1    Feb. 15, 2024

(30) Foreign Application Priority Data

Aug. 9, 2022  (IN) .............................. 202211045466

(51) Int. Cl.
*G06F 3/048*     (2013.01)
*G06F 3/04842*   (2022.01)
*H04L 12/12*     (2006.01)
*H04L 43/045*    (2022.01)

(52) U.S. Cl.
CPC ........ *H04L 43/045* (2013.01); *G06F 3/04842* (2013.01); *H04L 12/12* (2013.01)

(58) Field of Classification Search
CPC ... H04L 43/045; H04L 12/12; H04L 41/5009; H04L 43/08; H04L 43/0817; H04L 41/22; G06F 3/04842
See application file for complete search history.

(56) References Cited

U.S. PATENT DOCUMENTS

| | | |
|---|---|---|
| 8,423,322 B2 | 4/2013 | Steinberg et al. |
| 8,904,497 B2 | 12/2014 | Hsieh |
| 9,098,320 B2 | 8/2015 | Yung |
| 9,256,846 B2 | 2/2016 | Stluka et al. |

(Continued)

FOREIGN PATENT DOCUMENTS

| | | |
|---|---|---|
| CN | 108592352 B | 9/2020 |
| JP | 6834773 B2 | 2/2021 |

OTHER PUBLICATIONS

"Data Center Efficiency: The Benefits of RCI & RTI," (Part 2 of 3), Blog, Posted by RF Code, 10 pages, May 11, 2021.

(Continued)

*Primary Examiner* — Thanh T Vu
(74) *Attorney, Agent, or Firm* — Seager, Tufte & Wickhem, LLP

(57) ABSTRACT

Performance of a data center may be monitored by tracking operation conditions over time, including when the data center has an adequate power supply and when the data center lacks an adequate power supply. An uptime status may be determined from this data. The uptime status and other performance parameters may be calculated, and may be used in determining an overall performance score for the data center. A dashboard may be displayed that includes the uptime status and the overall performance score of the data center.

20 Claims, 15 Drawing Sheets

(56) References Cited

U.S. PATENT DOCUMENTS

| | | | |
|---|---|---|---|
| 9,568,923 | B1 | 2/2017 | Demetriou et al. |
| 9,678,518 | B2 | 6/2017 | Boesveld et al. |
| 9,762,460 | B2 | 9/2017 | Pawlowski et al. |
| 9,903,737 | B2 | 2/2018 | Carpenter et al. |
| 9,912,192 | B2 | 3/2018 | Miller |
| 9,958,178 | B2 | 5/2018 | Palmer et al. |
| 9,995,501 | B2 | 6/2018 | Quam et al. |
| 10,065,143 | B2 | 9/2018 | Beier |
| 10,254,720 | B2 | 4/2019 | Slessman et al. |
| 10,410,502 | B2 | 9/2019 | Federspiel et al. |
| 10,447,546 | B1 | 10/2019 | Guo et al. |
| 10,574,529 | B2 | 2/2020 | Marinelli et al. |
| 10,817,398 | B2 | 10/2020 | Cencini et al. |
| 10,852,805 | B2 | 12/2020 | Magcale et al. |
| 10,956,841 | B2 | 3/2021 | Langborg-Hansen et al. |
| 10,983,891 | B2 | 4/2021 | Dadd et al. |
| 11,079,731 | B2 | 8/2021 | Khurana et al. |
| 11,275,396 | B2 | 3/2022 | Kamel et al. |
| 11,284,544 | B1 | 3/2022 | Lingle et al. |
| 2008/0276234 | A1 | 11/2008 | Taylor et al. |
| 2008/0288193 | A1 | 11/2008 | Classen et al. |
| 2012/0131217 | A1 | 5/2012 | Delorme et al. |
| 2013/0197895 | A1* | 8/2013 | Wang ............... G06F 1/3203 703/21 |
| 2013/0262170 | A1* | 10/2013 | Cordio ............. G06Q 10/06316 705/7.15 |
| 2015/0051749 | A1* | 2/2015 | Hancock ............ G01R 21/1331 700/295 |
| 2016/0087859 | A1 | 3/2016 | Kuan et al. |
| 2016/0087861 | A1 | 3/2016 | Kuan et al. |
| 2016/0132839 | A1 | 5/2016 | Randolph |
| 2016/0198593 | A1 | 7/2016 | Schmitt et al. |
| 2017/0201424 | A1 | 7/2017 | Doraiswamy et al. |
| 2017/0219241 | A1 | 8/2017 | Magcale et al. |
| 2017/0308802 | A1 | 10/2017 | Ramsøy et al. |
| 2018/0052574 | A1 | 2/2018 | Wolfe et al. |
| 2018/0293038 | A1 | 10/2018 | Meruva et al. |
| 2019/0145645 | A1 | 5/2019 | Magcale |
| 2020/0003448 | A1* | 1/2020 | Schwegler ............... F24F 11/39 |
| 2020/0089176 | A1 | 3/2020 | Wacker |
| 2020/0100394 | A1 | 3/2020 | Albinger et al. |
| 2020/0208862 | A1 | 7/2020 | Mikulica et al. |
| 2020/0349155 | A1 | 11/2020 | Reinshagen et al. |
| 2021/0152455 | A1* | 5/2021 | Castle ................ H04L 43/0876 |
| 2021/0329812 | A1 | 10/2021 | Morgan et al. |
| 2021/0333770 | A1 | 10/2021 | Khurana et al. |
| 2021/0356858 | A1 | 11/2021 | Chuang et al. |
| 2023/0300052 | A1 | 9/2023 | Dugar et al. |

OTHER PUBLICATIONS

"Enterprise Dashboard,"—Galileo Performance Explorer Blog, 8 pages, May 13, 2021.
Alfsolli, "Environmental Monitoring with Zabbix," Zabbix Blog, 8 pages, May 13, 2021.
"Galileo Performance Explorer—IT Capacity & Performance Management," Blog, The Explorer, 7 pages, May 13, 2021.
"Galileo Performance Explorer—SAN Performance Monitoring," ATS Group, 1 page, 2021.
"Galileo—the Stars Align Overview," Galileo Performance Explorer, 1 page, 2017.
"Galileo Use Cases Capacity Planning," Galileo Performance Explorer, 1 page, 2018.
"Galileo Solution Guide Performance Monitoring Vmware," ATS Group, 20 pages, 2021.
"Operational Intelligence" Galileo Performance Explorer, 8 pages, May 13, 2021.
"Performance Monitoring" Galileo Performance Explorer, 8 pages, May 13, 2021.
"Predictive Analytics" Galileo Performance Explorer, 8 pages, May 13, 2021.
Lambert, "Trend Prediction Tutorial in Zabbix 4.0," Zabbix Blog, 2019.
U.S. Appl. No. 17/749,047, filed May 19, 2022.
"Dynamic Control," Vigilent, 5 pages, 2022. Accessed May 17, 2022.
"Dynamic Optimization," Vigilent, 2 pages, 2022.
"Energy Savings," Vigilent, 2 pages, 2022.
"Insite Infrastructure Monitoring," VExchange Colocation Services, 5 pages, 2021.
"Machine Learning Vigilent," 5 pages, 2022.
"Monitoring," Vigilent, 5 pages, 2022.
"Reclaim Cooling Capacity," Vigilent, 2 pages, 2022.
"Struxture Ware Data Center Operation," Schneider Electric, 4 pages, 2017.
"System Architecture," Vigilent 3 pages, 2022.
"Uptime Protection," Vigilent, 4 pages, 2022.
"The Must-Have Cooling Solution That Pays for Itself", Data Center/Vigilent, pp. 1-4, Feb. 15, 2022. Accessed May 17, 2022.
"Server Power and Performance Evaluation in High-Temperature Environments", Intel, pp. 1-8, 2012.
Uddin et al., "Power Usage Effectiveness Metrics to Measure Efficiency and Performance of Data Centers," Applied Mathematics and Information Sciences, vol. 8, No. 5, pp. 2207-2216, 2014.
"Data Center Vigilent," 4 pages, 2022.

* cited by examiner

| Site ID | Site Name | Over all Performance | | Total Weighted metric | Total Max possible metric |
|---|---|---|---|---|---|
| | | Score (%) | Rating | | |
| Portfolio | | 87.8 | Good | 996 | 1134 |
| Site 1 | Amsterdam | 96.3 | Excellent | 156 | 162 |
| Site 2 | Berlin | 88.9 | Good | 144 | 162 |
| Site 3 | Frankfurt | 55.6 | Poor | 90 | 162 |
| Site 4 | London | 100.0 | Excellent | 162 | 162 |
| Site 5 | Madrid | 85.2 | Good | 138 | 162 |
| Site 6 | Milan | 92.6 | Excellent | 150 | 162 |
| Site 7 | Paris | 96.3 | Excellent | 156 | 162 |

FIG. 5A

| | A | B | C | D | E | F |
|---|---|---|---|---|---|---|
| Site Name | Berlin | | | | | |
| Report gener | 22-Feb-22, 10:25am | | | | | |
| Uptime | 98.994% | | | | | |
| Total Rack D | 1/990 | | | | | |
| Total Down T | 4 mins | | | | | |
| Timerange | 22-Feb-22, 00:00:00 am 22-Feb-22, 10:25am | | | | | |
| Site Name | Location | Rack Name | Total Downtime | Offline Timestamp | Online Time |
| Berlin | Location 1 | Rack 1 | 2 min | 22-Feb-22, 02:00:00 am | 22-Feb-22, 02:02:00 am |
| Berlin | Location 2 | Rack 1 | 2 min | 22-Feb-22, 05:00:00 am | 22-Feb-22, 05:02:00 am |

FIG. 8

PERFORMANCE INDICATORS USEFUL FOR MONITORING THE OVERALL PERFORMANCE OF A DATA CENTER

CROSS-REFERENCE TO RELATED APPLICATIONS

This application claims priority pursuant to 35 U.S.C. 119(a) to Indian Application No. 202211045466, filed Aug. 9, 2022, which application is incorporated herein by reference in its entirety.

TECHNICAL FIELD

The present disclosure pertains generally to systems and methods for monitoring the overall performance of a data center.

BACKGROUND

A data center typically includes a large number of computer servers in close proximity to each other arranged in server racks. An organization may have a single data center. An organization may have a plurality of data centers that may be distributed across a city, across a state, across a nation or event distributed internationally. A variety of parameters may be used to track the performance of a particular data center or to collectively track the performance of a portfolio of several or even many data centers. It will be appreciated that a data center may generate a prodigious volume of data that is available to an operator. It can be difficult for an operator to sift through this prodigious volume of data to quickly and easily identify an overall performance of the data center. What would be desirable is a method and system to track and view the overall performance of a data center or a portfolio of data centers.

SUMMARY

This disclosure relates generally to systems and methods for monitoring the overall performance of a data center or a portfolio of data centers. More particularly, this disclosure relates to methods and systems to track and view the overall performance of a data center or a portfolio of data centers. An example may be found in a system for monitoring performance of a data center that includes a plurality of server racks, where each of the server racks include one or more power supply units that are configured to provide power to the respective server rack. The illustrative system includes an input port for receiving signals representative of a plurality of operating conditions of the data center. The plurality of operating conditions include a quality of power that is made available by one or more of the power supply units for each of the respective plurality of server racks of the data center. The illustrative system further includes a user interface including a display, and a controller operably coupled with the input port and the user interface. The controller is configured to receive signals over time via the input port that are representative of the plurality of operating conditions of the data center, and for each of the plurality of server racks, determine when the quality of power that is made available by the respective one or more power supply units falls outside of a predefined power quality criteria. The controller is configured to, for each of the plurality of server racks, determine an amount of time that the quality of power that is made available by the respective one or more power supply units remains outside of the predefined power quality criteria. The controller is configured to determine an uptime status of the data center based at least in part on an aggregate of the amount of time that the quality of power made available by the respective one or more power supply units for each of the plurality of server racks remains outside of the predefined power quality criteria aggregated over the plurality of server racks. The controller is then configured to display a dashboard on the display, wherein the dashboard displays the uptime status of the data center.

Another example may be found in a method of monitoring performance of a data center using a computing device, the data center including a plurality of server racks, each of the plurality of server racks including one or more power supply units configured to provide power to the respective server rack. The illustrative method includes the computing device receiving signals representative of a plurality of operating conditions of the data center. The plurality of operating conditions include a quality of power that is made available by one or more of the power supply units for each of the respective plurality of server racks of the data center. The computing device determines an uptime status of the data center based at least in part upon an aggregate of an amount of time that the quality of power made available by the respective one or more power supply units for each of the plurality of server racks remains outside of a predefined power quality criteria aggregated over the plurality of server racks. The computing device also determines one or more performance parameters based at least in part upon some of the signals representative of the plurality of operating conditions of the data center. The computing device determines an overall performance score for the data center, wherein the overall performance score is based at least in part upon the uptime status of the data center and one or more of the performance parameters. The computing device generates a dashboard displayable on a display, wherein the dashboard displays the overall performance score for the data center and in some cases the uptime status of the data center.

Another example may be found in a non-transitory computer-readable storage medium having executable instructions stored thereon. When the executable instructions are executed by one or more processors, the one or more processors are caused to receive signals representative of a plurality of operating conditions of a data center. The one or more processors are caused to determine an uptime status for the data center based at least in part upon a quality of power that is made available by respective one or more power supply units for each of a plurality of server racks of the data center remaining within a predefined power quality criteria. The one or more processors are caused to determine one or more performance parameters based at least in part upon some of the signals representative of the plurality of operating conditions of the data center. The one or more processors are caused to determine an overall performance score for the data center. The overall performance score is based at least in part upon the uptime status of the data center and one or more of the performance parameters. The one or more processors are caused to generate a dashboard displayable on a display, wherein the dashboard displays the overall performance score for the data center and in some cases the uptime status of the data center.

The preceding summary is provided to facilitate an understanding of some of the features of the present disclosure and is not intended to be a full description. A full appreciation of the disclosure can be gained by taking the entire specification, claims, drawings, and abstract as a whole.

BRIEF DESCRIPTION OF THE DRAWINGS

The disclosure may be more completely understood in consideration of the following description of various illustrative embodiments of the disclosure in connection with the accompanying drawings, in which:

FIGS. 5A, 5B, 5C and 5D together show an illustrative example of a spreadsheet showing calculation of an overall performance score of each of a plurality of data centers;

FIG. 8 shows a report that may be generated and displayed by the illustrative monitoring system of FIG. 1;

Figure 1:
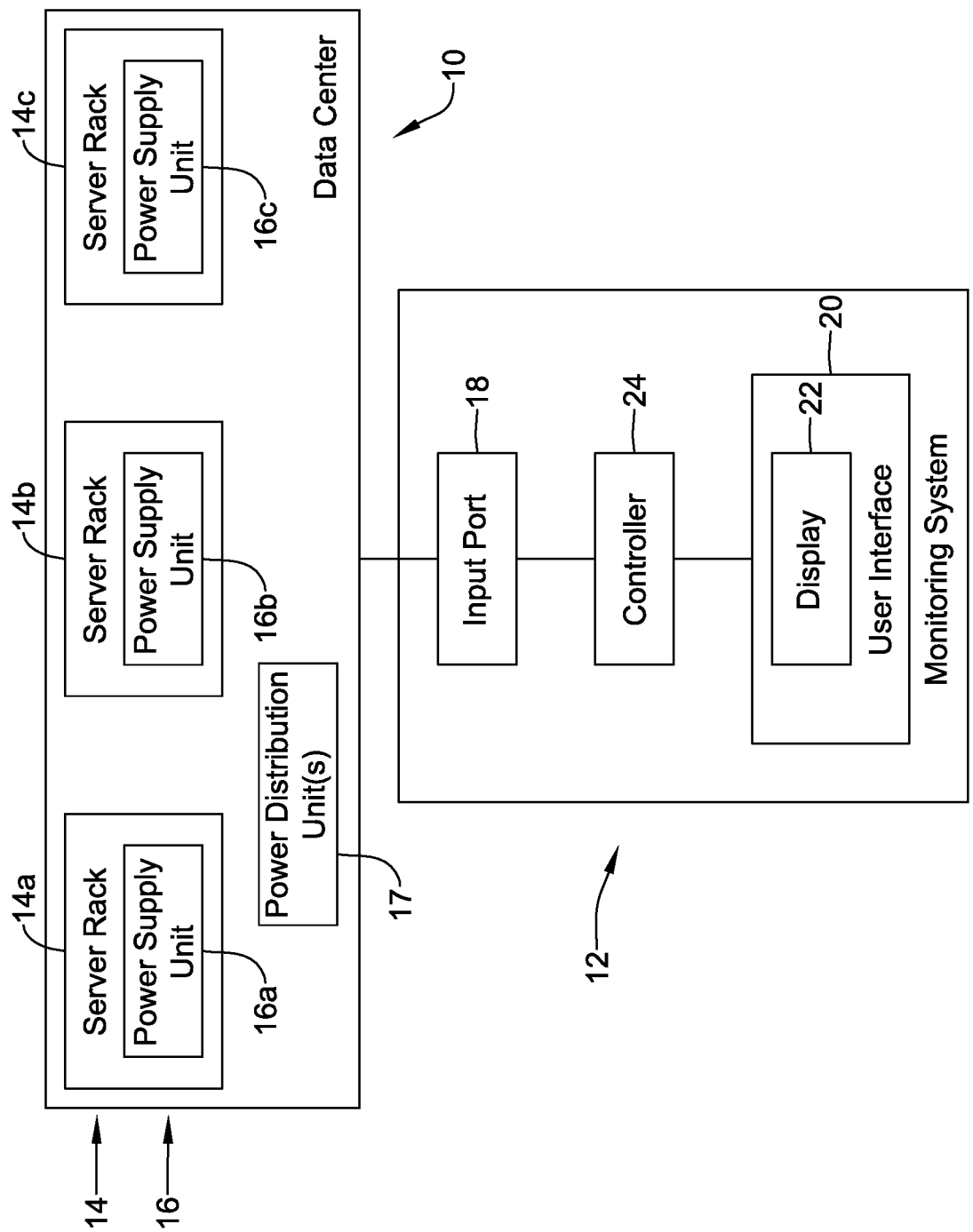
FIG. 1 is a schematic block diagram of a data center and an illustrative monitoring system for monitoring the data center.

While the disclosure is amenable to various modifications and alternative forms, specifics thereof have been shown by way of example in the drawings and will be described in detail. It should be understood, however, that the intention is not to limit aspects of the disclosure to the particular illustrative embodiments described. On the contrary, the intention is to cover all modifications, equivalents, and alternatives falling within the spirit and scope of the disclosure.

DESCRIPTION

The following description should be read with reference to the drawings wherein like reference numerals indicate like elements. The drawings, which are not necessarily to scale, are not intended to limit the scope of the disclosure. In some of the figures, elements not believed necessary to an understanding of relationships among illustrated components may have been omitted for clarity.

All numbers are herein assumed to be modified by the term "about", unless the content clearly dictates otherwise. The recitation of numerical ranges by endpoints includes all numbers subsumed within that range (e.g., 1 to 5 includes 1, 1.5, 2, 2.75, 3, 3.80, 4, and 5).

As used in this specification and the appended claims, the singular forms "a", "an", and "the" include the plural referents unless the content clearly dictates otherwise. As used in this specification and the appended claims, the term "or" is generally employed in its sense including "and/or" unless the content clearly dictates otherwise.

It is noted that references in the specification to "an embodiment", "some embodiments", "other embodiments", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is contemplated that the feature, structure, or characteristic may be applied to other embodiments whether or not explicitly described unless clearly stated to the contrary.

FIG. 1 is a schematic block diagram showing an illustrative data center and an illustrative monitoring system 12 for monitoring the performance of the data center 10. While the monitoring system 12 is shown as being distinct from the data center 10, in some cases, the monitoring system 12 may be incorporated into the data center 10. In some cases, the monitoring system 12 may be remote from the data center. The monitoring system 12 may be a computing device such as a computer or a computer server. At least part of the monitoring system 12 may be disposed within a cloud-based computer server, for example. In some cases, the monitoring system 12 may be distributed, with some functionality of the monitoring system 12 located at the edge, such as at or near the data center 10, and with some functionality of the monitoring system 12 located in a cloud-based server.

The illustrative data center 10 includes a number of server racks 14, individually labeled as 14a, 14b and 14c. While a total of three server racks 14 are shown, it will be appreciated that this is merely illustrative, as the data center 10 may include any number of server racks 14, and may likely include substantially more than three server racks 14. Each of the server racks 14 include a number of computer servers. Each of the server racks 14 include one or more power supply units 16, individually labeled as 16a, 16b and 16c. While each server rack 14 is shown as including a single power supply unit 16, in some cases at least some of the server racks 14 may include two, three, four or more power supply units 16. In some cases, the power needs of a particular server rack 14 may necessitate having two or more power supply units 16. In some cases, a server rack 14 may include two or more power supply units 16, with one power supply unit 16 meeting the power needs of the particular server rack 14 and one or more others of the power supply units 16 providing a back-up, or redundancy factor.

In some cases, the data center may include a number of power distribution units 17 that are responsible for distributing power to the various power supply units 16 of the server racks 14. In some cases, some or all of the power distribution units 17 may be controllable, such that power may be distributed to the power supply units 16 of the various server racks 14 according to the load presented by the individual server racks 14. In some cases, commands may be sent to one or more of the power distribution units 17 to re-distribute the power among the various server racks 14, such as when the quality of the power that is delivered to the power supply unit(s) 16 of a particular server rack 14 falls below predefined power quality criteria. Alternatively, or in addition, commands may be sent out to one or more of the power distribution units 17 to filter the power, at least temporarily, that is delivered to the power supply unit(s) 16 of a particular server rack 14. Alternatively, or in addition, a maintenance request may be sent. The maintenance request may request that maintenance personnel upgrade and/or replace one or more of the power supply unit(s) 16 of a particular server rack 14. Alternatively, or in addition, the maintenance request may request that maintenance personnel move one or more servers from a particular server rack to another server rack of the data center. These are just examples.

In the example shown, the monitoring system 12 includes an input port 18 for receiving signals representative of a plurality of operating conditions of the data center 10. The plurality of operating conditions include a quality of power that is made available by one or more of the power supply units 16 for each of the respective plurality of server racks 14 of the data center 10. The illustrative monitoring system 12 further includes a user interface 20 including a display 22. The user interface 20 may be a free-standing laptop computer or desktop computer, for example, and thus the display 22 may be part of the laptop computer or operably coupled with the desktop computer. The user interface 20 may be part of a mobile device such as a mobile phone or tablet computer. These are just examples.

The illustrative monitoring system 12 includes a controller 24 that is operably coupled with the input port 18 and the user interface 20. The controller 24 is configured to receive signals over time via the input port 18 that are representative of the plurality of operating conditions of the data center 10. The controller 24 is configured to, for each of the plurality of server racks 14, determine when the quality of power that is made available by the respective one or more power supply units 16 falls outside of a predefined power quality criteria, and, for each of the plurality of server racks 14, determine an amount of time that the quality of power that is made available by the respective one or more power supply units 16 remains outside of the predefined power quality criteria.

It is contemplated that the predefined power quality criteria for the power that is delivered by the power supply unit(s) 16 of the server racks 14 may include any suitable power quality metric including, for example, an amplitude metric, a phase metric and/or a noise metric. For example, if the voltage amplitude that is delivered by the power supply unit(s) 16 to a particular server rack 14 dips below a threshold voltage, the controller 24 may determine that the particular server rack is off-line until the voltage returns to above the threshold voltage. In another example, if the phase of the voltage and/or current that is delivered by the power supply unit(s) 16 to a particular server rack 14 is outside of a predetermined phase threshold, the controller 24 may determine that the particular server rack is off-line until the phase returns to below the phase threshold. In yet another example, if a noise level on the power delivered by the power supply unit(s) 16 to a particular server rack 14 is above a predetermined noise threshold, the controller 24 may determine that the particular server rack is off-line until the noise returns to below the noise threshold. These are just examples.

The controller 24 is configured to determine an uptime status of the data center 10 that is based at least in part on an aggregate of the amount of time that the quality of power made available by the respective one or more power supply units 16 for each of the plurality of server racks 14 remains outside of the predefined power quality criteria aggregated over the plurality of server racks 14. The illustrative controller 24 is configured to display a dashboard on the display 22, the dashboard displaying the uptime status of the data center 10. In some instances, the controller 24 may utilize other metrics in determining an uptime status of the data center 10. For example, in some cases, the controller 24 may utilize one or more environmental parameters such as but not limited to temperature and humidity for determining uptime.

In some instances, the controller 24 may be configured to determine an amount of time that the quality of power that is made available by the respective one or more power supply units 16 for each of the plurality of server racks 14 is within the predefined power quality criteria aggregated over the plurality of server racks 14. The uptime status may be expressed as a percentage of time that the quality of power that is made available by the respective one or more power supply units 16 for each of the plurality of server racks 14 is within the predefined power quality criteria aggregated over the plurality of server racks 14. The controller 24 may be configured to classify the uptime status into a selected performance category of three or more performance categories, wherein each of the three or more performance categories represent a different performance level (e.g. excellent, good, poor) of the data center 10. The controller may display on the display 22 the selected performance category concurrently with the uptime status.

In some cases, the controller 24 may be configured to receive a user input via the user interface 20 that requests one or more maintenance tasks be performed to improve the uptime status of the data center 10. The controller 24 may be configured to, in response to the user input, send one or more maintenance requests to maintenance personnel to improve the uptime status of the data center 10. The maintenance requests may request that maintenance personnel upgrade and/or replace one or more of the power supply unit(s) 16 of a particular server rack 14. Alternatively, or in addition, the maintenance request may request that maintenance personnel move one or more servers from a particular server rack to another server rack of the data center. These are just example maintenance requests.

In some cases, the user input may cause commands to be sent to one or more of the power distribution units 17 of the data center to re-distribute the power among the various server racks 14. Alternatively, or in addition, the user input may case commands to be sent to one or more of the power distribution units 17 of the data center 10 to filter the power, at least temporarily, that is delivered to the power supply unit(s) 16 of a particular server rack 14. In some cases, a data center controller may automatically send one or more of these commands without user input.

In some instances, the controller 24 may be configured to receive a user input via the user interface 20 identifying a selected time period, and to determine the uptime status of the data center 10 for the selected time period based at least in part on an aggregate of the amount of time during the selected time period that the quality of power that is made available by the respective one or more power supply units 16 for each of the plurality of server racks 14 remains outside of the predefined power quality criteria aggregated over the plurality of server racks 14 of the data center 10. In some cases, the controller 24 may be configured to determine the uptime status of the data center 10 during each of a plurality of time intervals, and to concurrently display on the display 22 the determined uptime status of the data center for each of the plurality of time intervals (e.g. see panel 158 of FIG. 7).

In some instances, the controller 24 may be configured to display on the display 22 the aggregate of the amount of time that the quality of power that is made available by the respective one or more power supply units 16 for each of the plurality of server racks 14 remains outside of the predefined power quality criteria aggregated over the plurality of server racks 14 of the data center 10. The controller 24 may be configured to display how many of the plurality of server racks 14 of the data center 10 had the quality of power made available by the respective one or more power supply units 16 fall outside of the predefined power quality criteria. The controller 24 may be configured to display on the display 22 an identifier of each of the plurality of server racks 14 of the data center 10 that had the quality of power made available by the respective one or more power supply units 16 fall outside of the predefined power quality criteria along with the amount of time that the quality of power for the respective server rack 14 was outside of the predefined power quality criteria.

In some instances, the controller 24 may be configured to identify a Power Utilization Effectiveness (PUE) of the data center 10. PUE is a metric used to determine the energy efficiency of the data center 10. PUE may be determined by dividing the total amount of power entering a data center 10 by the power used to run the IT equipment (e.g. servers) within the data center 10. PUE may be expressed as a ratio, with overall energy efficiency improving as the quotient decreases toward 1.0.

The controller 24 may be configured to determine an overall performance score for the data center 10. The overall performance score of the data center 10 may be based at least in part on a weighted sum of the uptime status of the data center 10 and the PUE of the data center 10. The controller 24 may be configured to display the performance score for the data center 10 on the display 22. In some instances, the controller 24 may additionally or alternatively utilize other parameters for determining the overall performance score of the data center 10. For example, the controller 24 may utilize one or more of network uptime, cooling uptime, network availability, ISP (Internet Service Provider) uptime, software (SaaS) uptime, environmental impact, electrical redundancy and network redundancy, among others. These are just examples.

The controller 24 may be configured to identify a number of occurrences of predetermined alarms associated with the data center 10. The predetermined alarms may not include all alarms issued by the data center. In some cases, the predetermined alarms may be only high priority alarms and/or alarms that have been repeated at least a threshold number of times. Any suitable alarm filtering may be used to identify the predetermined alarms. The number of occurrences of predetermined alarms associated with the data center 10 may be tallied over a predetermined period of time (e.g. a set period of time such as a day, a week, or a month, or a user selected period of time). In some cases, the performance score for the data center 10 may be based at least in part on a weighted sum of the uptime status of the data center 10, the PUE of the data center and the number of occurrences of the predetermined alarms associated with the data center 10. In some cases, the performance score for the data center 10 may be based at least in part on a weighted sum of the uptime status of the data center 10 and the number of occurrences of the predetermined alarms associated with the data center 10. In some cases, the performance score for the data center 10 may be based at least in part on a weighted sum of the PUE of the data center 10 and the number of occurrences of the predetermined alarms associated with the data center 10. These are just examples. The controller 24 may be configured to send one or more control signals to the data center to improve the uptime status of the data center 10 and/or the performance score of the data center 10. The one or more control signals may include one or more control commands and/or one or more maintenance requests.

Figure 2:
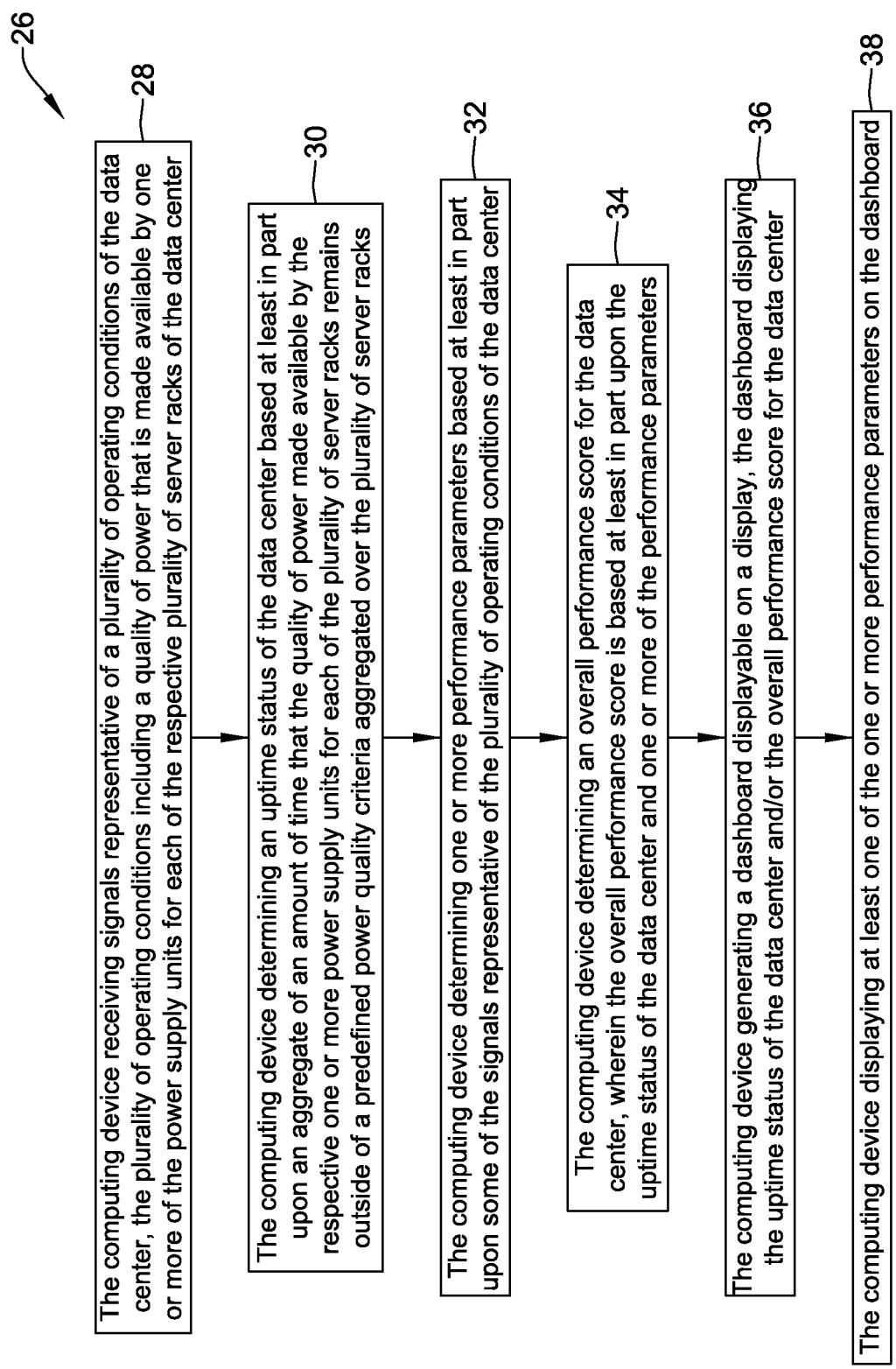
FIG. 2 is a flow diagram showing an illustrative method that may be carried out by the illustrative monitoring system of FIG. 1.

FIG. 2 is a flow diagram showing an illustrative method 26 of monitoring performance of a data center (such as the data center 10) using a computing device. The data center includes a plurality of server racks (such as the server racks 14), where each of the plurality of server racks include one or more power supply units (such as the power supply units 16) that are configured to provide power to the respective server rack. In some cases, the computing device may be an example of the monitoring system 12 shown in FIG. 1. The illustrative method 26 includes the computing device receiving signals representative of a plurality of operating conditions of the data center, the plurality of operating conditions including a quality of power that is made available by one or more of the power supply units for each of the respective plurality of server racks of the data center, as indicated at block 28. The computing device determines an uptime status of the data center based at least in part upon an aggregate of an amount of time that the quality of power made available by the respective one or more power supply units for each of the plurality of server racks remains outside of a predefined power quality criteria aggregated over the plurality of server racks, as indicated at block 30.

The computing device determines one or more performance parameters based at least in part upon some of the signals representative of the plurality of operating conditions of the data center, as indicated at block 32. In some cases, at least one of the one or more performance parameters include one or more of a PUE (Power Utilization Efficiency) parameter, a CUE (Carbon Utilization Efficiency) parameter and a WUE (Water Utilization Efficiency) parameter. At least one of the one or more performance parameters may include an alarm parameter that is representative of a number of occurrences of one or more predetermined alarms associated with the data center that have occurred within a predetermined time period (e.g. a set period of time such as a day, a week, or a month, or a user selected period of time).

The computing device determines an overall performance score for the data center, wherein the overall performance score is based at least in part upon the uptime status of the data center and one or more of the performance parameters, as indicated at block 34. The computing device generates a dashboard displayable on a display, where the dashboard displays the uptime status of the data center and/or the overall performance score for the data center, as indicated at block 36. In some cases, the method 26 may further include the computing device displaying at least one of the one or more performance parameters on the dashboard, as indicated at block 38. In some cases, the computing device may display at least one of the one or more performance parameters concurrently with the uptime status of the data center on the dashboard. In some cases, the computing device may display at least one of the one or more performance parameters concurrently with the overall performance score of the data center on the dashboard. In some cases, the computing device may display at least one of the one or more performance parameters concurrently with the uptime status of the data center and the overall performance score of the data center on the dashboard.

Figure 3:
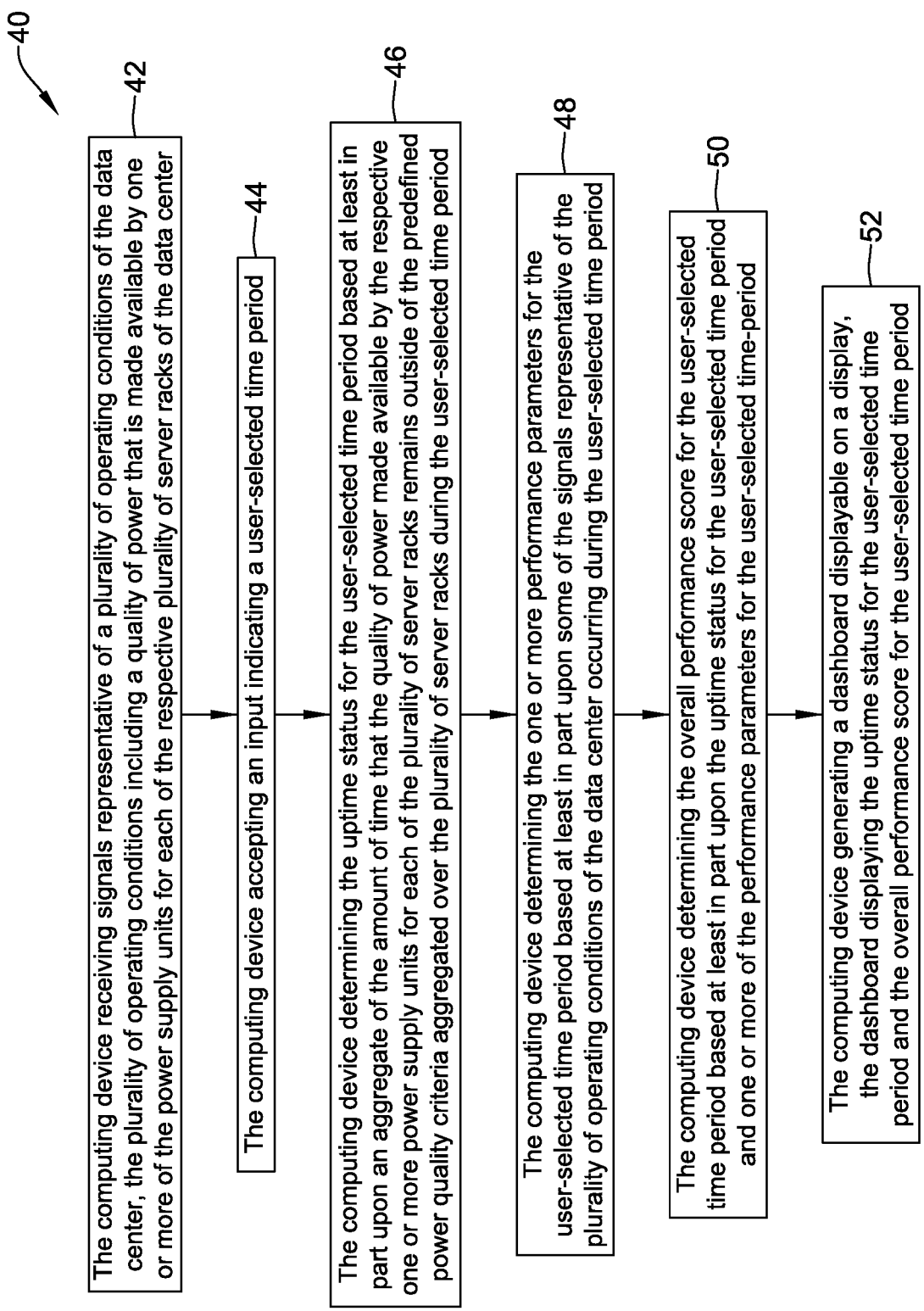
FIG. 3 is a flow diagram showing an illustrative method that may be carried out by the illustrative monitoring system of FIG. 1.

FIG. 3 is a flow diagram showing an illustrative method 40 of monitoring performance of a data center (such as the data center 10) using a computing device, the data center including a plurality of server racks (such as the server racks 14), each of the plurality of server racks including one or more power supply units (such as the power supply units 16) that are configured to provide power to the respective server rack. In some cases, the computing device may be an example of the monitoring system 12 shown in FIG. 1. The illustrative method 40 includes the computing device receiving signals representative of a plurality of operating conditions of the data center, the plurality of operating conditions including a quality of power that is made available by one or more of the power supply units for each of the respective plurality of server racks of the data center, as indicated at block 42.

The computing device accepts an input indicating a user-selected time period, as indicated at block 44. The computing device determines the uptime status for the user-selected time period based at least in part upon an aggregate of the amount of time that the quality of power made available by the respective one or more power supply units for each of the plurality of server racks remains outside of the predefined power quality criteria aggregated over the plurality of server racks during the user-selected time period, as indicated at block 46. The computing device determines the one or more performance parameters for the user-selected time period based at least in part upon some of the signals representative of the plurality of operating conditions of the data center occurring during the user-selected time period, as indicated at block 48. The computing device determines an overall performance score for the user-selected time period based at least in part upon the uptime status for the user-selected time period and one or more of the performance parameters for the user-selected time period, as indicated at block 50. The computing device generates a dashboard displayable on a display, where the dashboard displays the uptime status for the user-selected time period and the overall performance score for the user-selected time period, sometimes concurrently.

Figure 4:
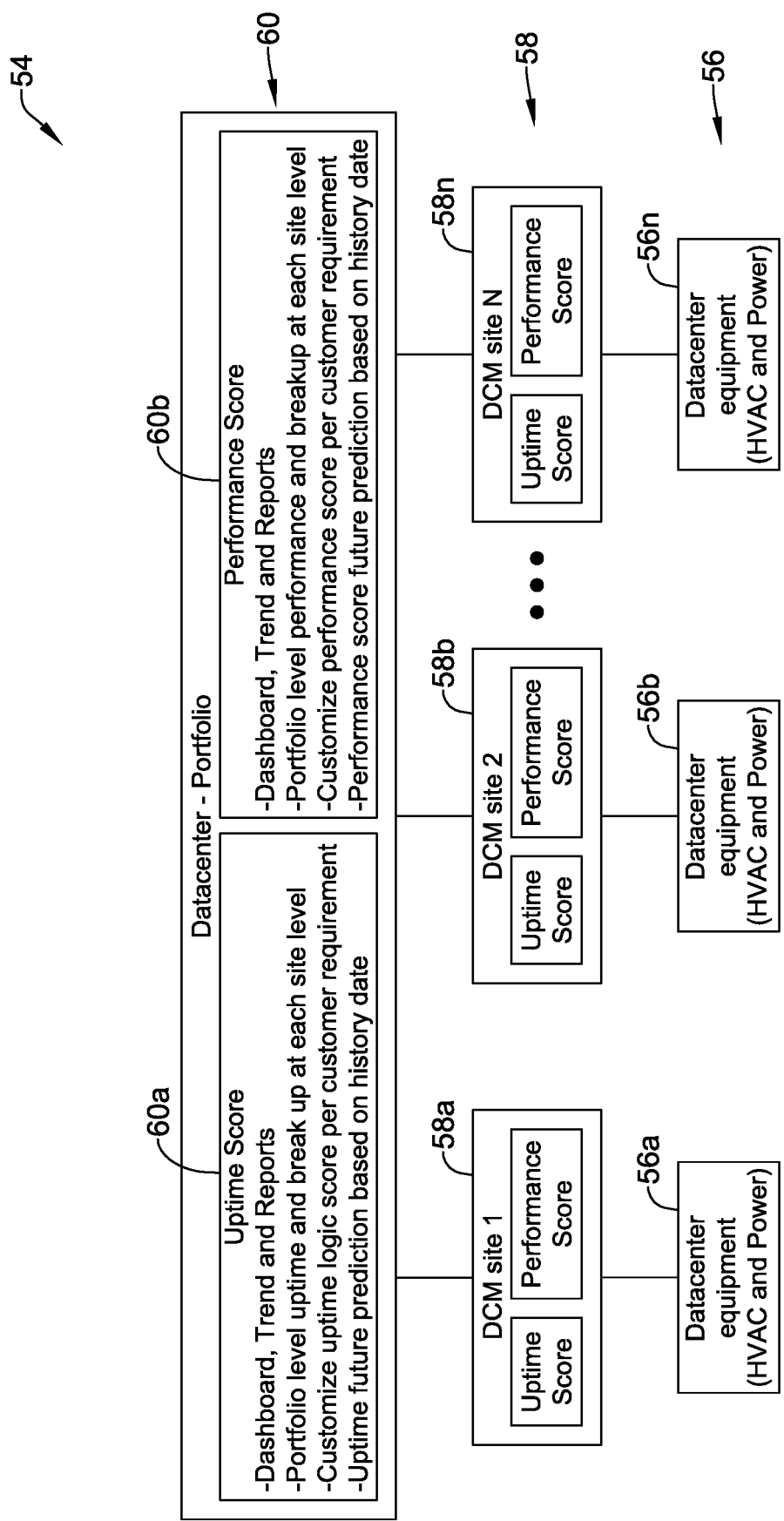
FIG. 4 is a schematic block diagram of an illustrative architecture.

FIG. 4 is a schematic block diagram showing an illustrative architecture 54 that includes several levels. Starting at an equipment level 56, there is a data center equipment 56*a* for a first data center, a data center equipment 56*b* for a second data center and a data center equipment 56*n* for an "Nth" data center, where "N" is an integer greater than 2. There may be any number of data centers, and thus any number of data center equipment 56. The data center equipment 56 includes HVAC equipment such as CRAH (computer room air handler) units and/or CRAC (computer room air conditioning) equipment. The data center equipment 56 also includes power equipment such as but not limited to the power supply units 16 for each server rack of the data center. Moving up a level is the data center site management level 58. The data center site management level 58 includes a data center site manager 58*a*, a data center site manager 58*b* and a data center site manager 58*n*. Each data center site manager 58 may calculate an Uptime Score for its corresponding data center. Each data center site manager 58 may calculate an Overall Performance Score for its corresponding data center. A portfolio level 60 includes compiling a portfolio-wide Uptime Score 60*a* and a portfolio-wide Overall Performance Score 60*b*.

FIGS. 5A, 5B, 5C and 5D together show an illustrative example of a spreadsheet 62 showing calculation of an overall performance score for each of a plurality of data center sites. Because of the size of the spreadsheet 62 in this example, it has been divided into an overall performance section 62*a* shown in FIG. 5A, an uptime performance section 62*b* shown in FIG. 5B, a PUE (power utilization efficiency) section 62*c* shown in FIG. 5C and a high alarm section 62*d* shown in FIG. 5D. In some cases, the spreadsheet 62 may include additional sections, showing factors that are used in determining the overall performance scores for the data center. For example, the spreadsheet 62 may additionally include a CUE (carbon utilization efficiency) section, or perhaps a WUE (water utilization efficiency) section. The CUE section and/or a WUE section may be included instead of the PUE section or the high alarm section, for example, or may be included in addition.

Figure 5B:
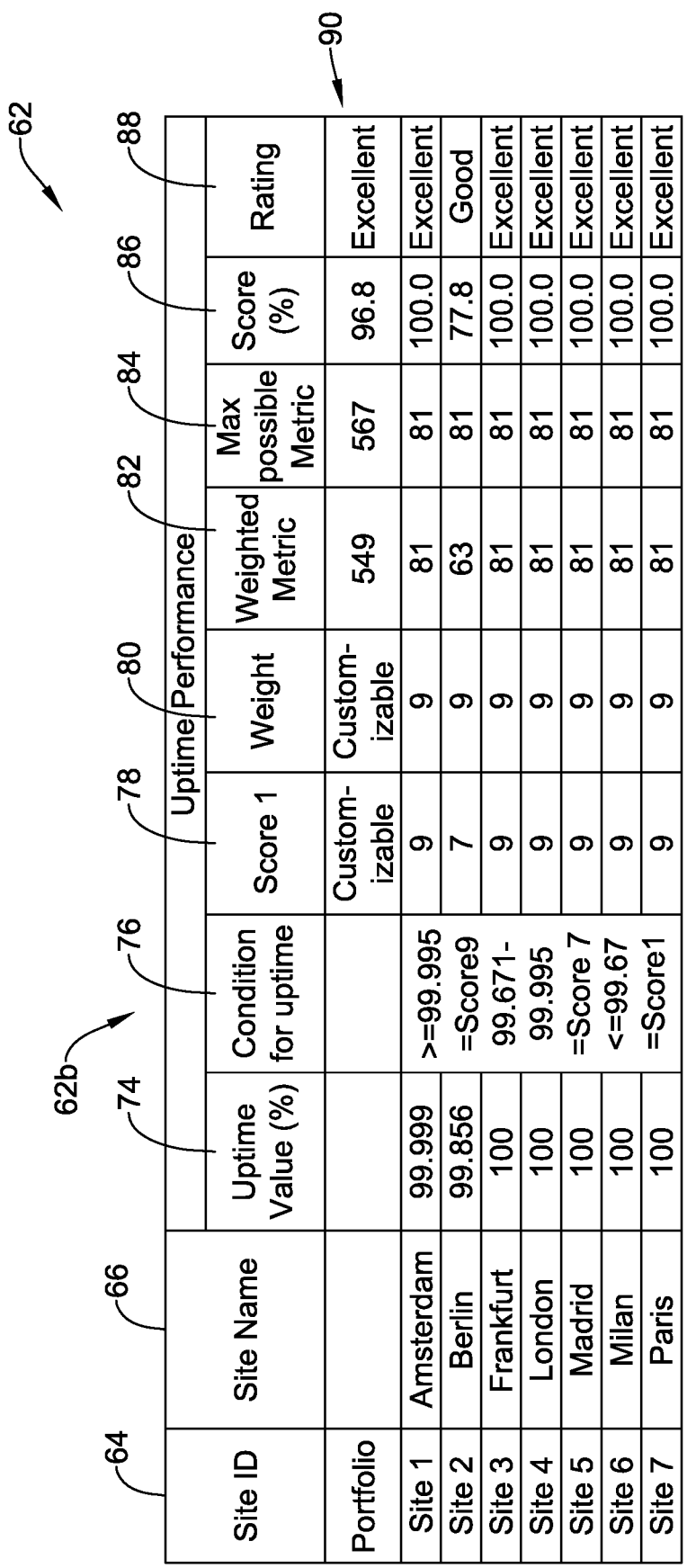
Figure 5C:
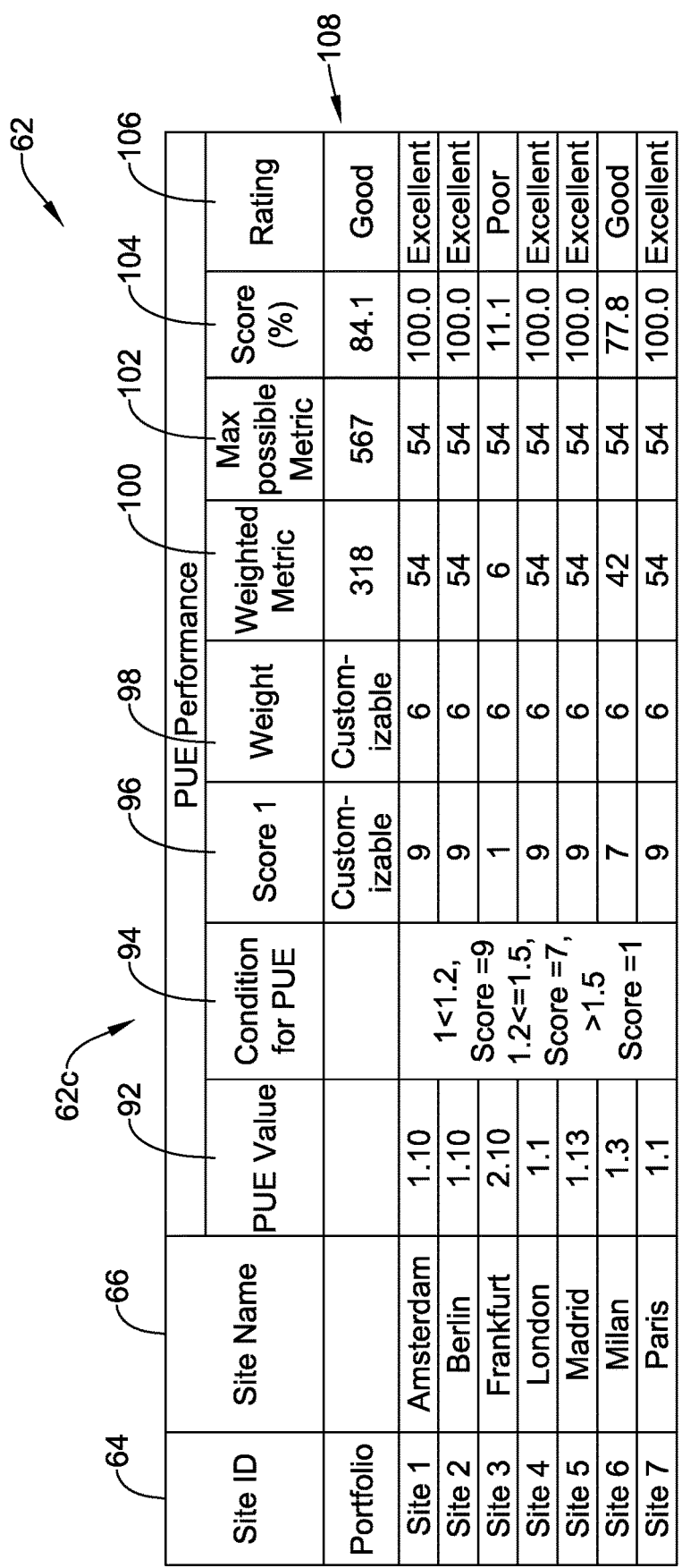
Figure 5D:
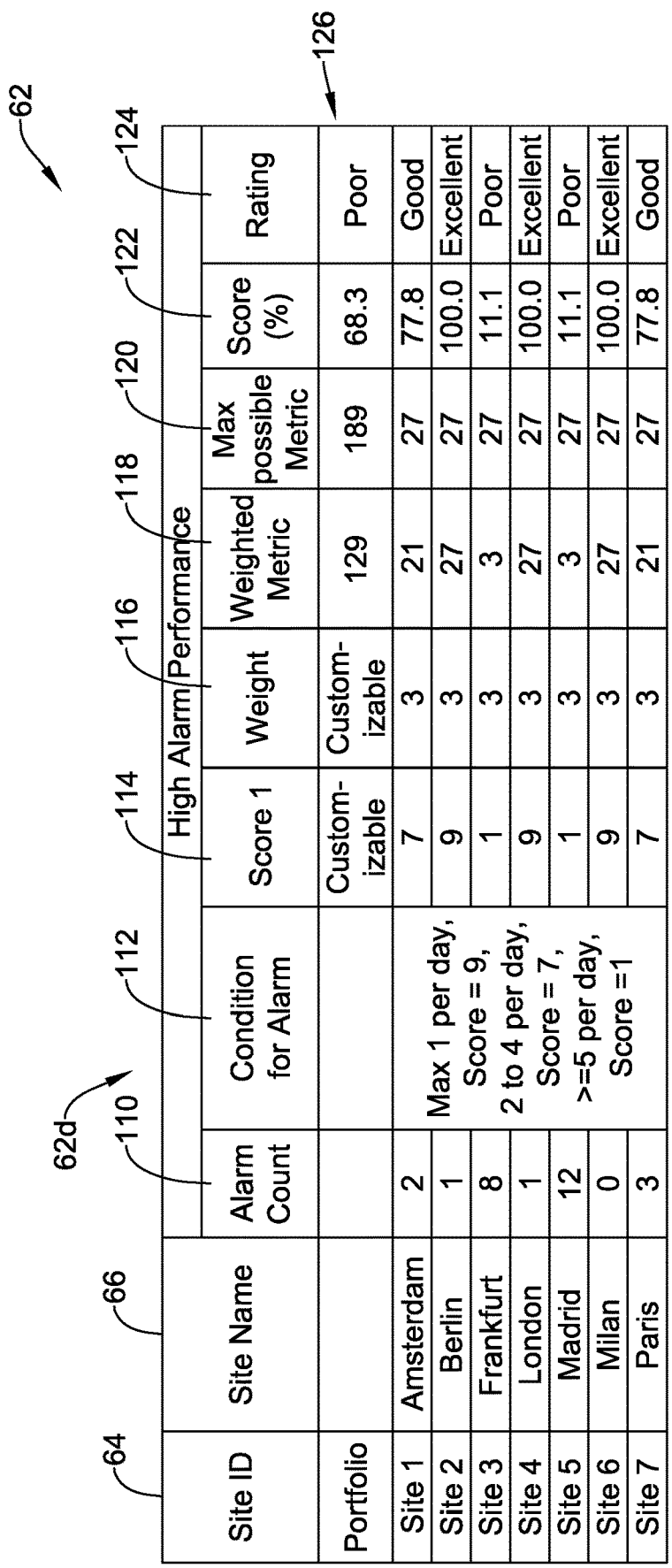

Starting with FIG. 5A, the overall performance section 62*a* may be considered as adding together the weighted metrics from the uptime performance section 62*b*, the PUE section 62*c* and the high alarm section 62*d* of FIG. 5B-5D. The overall performance section 62*a* includes a column 64 identifying Site ID's and a column 66 identifying Site Names for each of a plurality of data centers. These columns 64 and 66 are repeated in the other sections for continuity. An overall performance section 68 includes a column 68*a* showing an overall numerical score, presented as a percentage. A column 70 provides a total weighted metric that represents a summation of the weighted metrics for each factor in FIGS. 5B-5D. A column 72 provides a total maximum possible weighted metric for all of the factors in FIGS. 5B-5C. Dividing the total weighted metric by the maximum possible weighted metric, times 100, yields the percentages shown in the column 68*a*. The overall performance section 68 includes a column 68*b* that provides a rating that corresponds to the overall numerical score shown in column 68*a*.

The overall numerical score shown in column 68*a* may be classified into a selected performance category of three or more performance categories, wherein each of the three or more performance categories represent a different performance level (e.g. excellent, good, poor) of the data center 10. In this case, the selected performance category may be considered the rating of the performance level (e.g. excellent, good, poor) of the data center 10. In some cases, the overall numerical score from column 68*a* may be displayed on a dashboard. In some cases, the rating from column 68*b* may be displayed on a dashboard.

FIG. 5B shows the Uptime Performance section 62*b* of the spreadsheet 62. An input to the spreadsheet 62 is an uptime value, expressed as a percentage, as shown in column 74. The uptime value provides an indication of how much time, relative to total elapsed time, that the power supply units 16 for each server rack 14 within the data center 10 have provided power within predefined power quality criteria, aggregated over the plurality of server racks 14 of the data center 10. Column 76 provides a breakdown of how the uptime values are converted into a corresponding numerical score. In this example, the highest uptime values (e.g. greater than or equal to 99.995% uptime) are given a score of 9, intermediate uptime values (e.g. between 99.671% and 99.995%) are given a score of 7 and the lowest uptime values (e.g. less than or equal to 99.671%) are given a score of 3. In some cases, other scores may be used. For example, the uptime values may be converted into a score that could be 9, 8, 7, 6, 5, 4, 3, 2 or 1, or even decimals that are intermediate to any of the listed integers. Column 78 has the corresponding scores.

Column 80 shows a relative weighting value that is assigned to the uptime scores. In this example, the weighting values for the uptime values are assigned to be equal to 9. As will be discussed, in this example the weighting values for the PUE scores are assigned to be equal to 6 while the weighting values for the high alarm scores are assigned to be equal to 3. In some cases, other numbers may be used. For example, the weighting values for the PUE scores and/or the high alarm scores could be 9, 8, 7, 6, 5, 4, 3, 2 or 1, or even decimals that are intermediate to any of the listed integers. Column 82 shows the weighted metric values for each of the sites. This score is simply the score from column 78 times the weight from column 80. Column 84 shows a maximum weighted value, which is simply the highest possible score times the weighting value. Column 86 shows a numerical score, presented as a percentage, which is calculated by dividing the weighted metric from column 82 by the corresponding maximum weighted metric from column 84, times 100 to yield a percentage. Column 88 provides a corresponding rating.

A row 90 shows a summed weighted metric (in column 82) for all of the sites, a maximum weighted metric (in column 84) for all of the sites, a score (in column 86) for all of the sites, and an overall rating for all of the sites (in column 88). This may be used to determine an uptime status across a portfolio of data centers.

FIG. 5C shows the PUE Performance section 62c of the spreadsheet 62. An input to the spreadsheet 62 is an PUE value, as shown in column 92. The PUE value provides an indication of how efficiently the data center 10 has utilized power. Column 94 provides a breakdown of how the PUE values are converted into a numerical score. In this example, the highest PUE values (e.g. less than 1.2) are given a score of 9, intermediate PUE values (e.g. 1.2-1.5) are given a score of 7 and the lowest PUE values (e.g. greater than 1.5) are given a score of 3. In some cases, other scores may be used. For example, the uptime values may be converted into a score that could be 9, 8, 7, 6, 5, 4, 3, 2 or 1, or even decimals that are intermediate to any of the listed integers. Column 96 has the corresponding scores.

Column 98 shows a relative weighting value that is assigned to the scores for each of the sites. In this example, the weighting values for the PUE value are assigned to be equal to 6. In some cases, other numbers may be used. For example, the weighting values for the PUE scores could be 9, 8, 7, 6, 5, 4, 3, 2 or 1, or even decimals that are intermediate to any of the listed integers. Column 100 shows the weighted metric values for each of the sites. This score is simply the score from column 96 times the weight from column 98. Column 102 shows a maximum weighted value, which is simply the highest possible score times the weighting value. Column 104 shows a numerical score, presented as a percentage, which is calculated by dividing the weighted metric from column 100 by the corresponding maximum weighted metric from column 102, times 100 to yield a percentage. Column 106 provides a corresponding rating.

A row 108 shows a summed weighted metric (in column 100) for all of the sites, a maximum weighted metric (in column 102) for all of the sites, a score (in column 104) for all of the sites, and an overall rating for all of the sites (in column 106). This may be used to determine an PUE score across a portfolio of data centers.

FIG. 5D shows the High Alarm Performance section 62d of the spreadsheet 62. An input to the spreadsheet 62 is an alarm count, as shown in column 110. The alarm count provides a summation of how many predetermined alarms occurred during a particular period of time. The predetermined alarms may not include all alarms issued by the data center. In some cases, the predetermined alarms may be only high priority alarms and/or alarms that have been repeated at least a threshold number of times. Any suitable alarm filtering may be used to identify the predetermined alarms. The number of occurrences of predetermined alarms associated with the data center 10 may be tallied over a predetermined period of time (e.g. a set period of time such as a day, a week, or a month, or a user selected period of time).

Column 112 provides a breakdown of how the alarm count values are converted into a numerical score. In this example, a score of 9 is assigned for a minimal number of alarms (e.g. less than or equal to 1 predetermined alarm per the day), a score of 7 is assigned for an intermediate number of alarms (e.g. between 2 and 4 predetermined alarms per day), and a score of 1 is assigned for a higher number of alarms (e.g. 5 or more predetermined alarms per day). In some cases, other scores may be used. For example, the alarm counts may be converted to a score that could be 9, 8, 7, 6, 5, 4, 3, 2 or 1, or even decimals that are intermediate to any of the listed integers. Column 114 has the corresponding scores.

Column 116 shows a relative weighting value that is assigned to the scores for each of the sites. In this example, the weighting values for the alarm counts are assigned to be equal to 3. In some cases, other numbers may be used. For example, the weighting values for the alarm counts could be 9, 8, 7, 6, 5, 4, 3, 2 or 1, or even decimals that are intermediate to any of the listed integers. Column 118 shows the weighted metric values for each of the sites. This score is simply the score from column 114 times the weight from column 116. Column 120 shows a maximum weighted value, which is simply the highest possible score times the weighting value. Column 122 shows a numerical score, presented as a percentage, which is calculated by dividing the weighted metric from column 118 by the corresponding maximum weighted metric from column 120, times 100 to yield a percentage. Column 124 provides a corresponding rating.

A row 126 shows a summed weighted metric (in column 118) for all of the sites, a maximum weighted metric (in column 120) for all of the sites, a score (in column 122) for all of the sites, and an overall rating for all of the sites (in column 124). This may be used to determine an alarm score across a portfolio of data centers.

Figure 6:
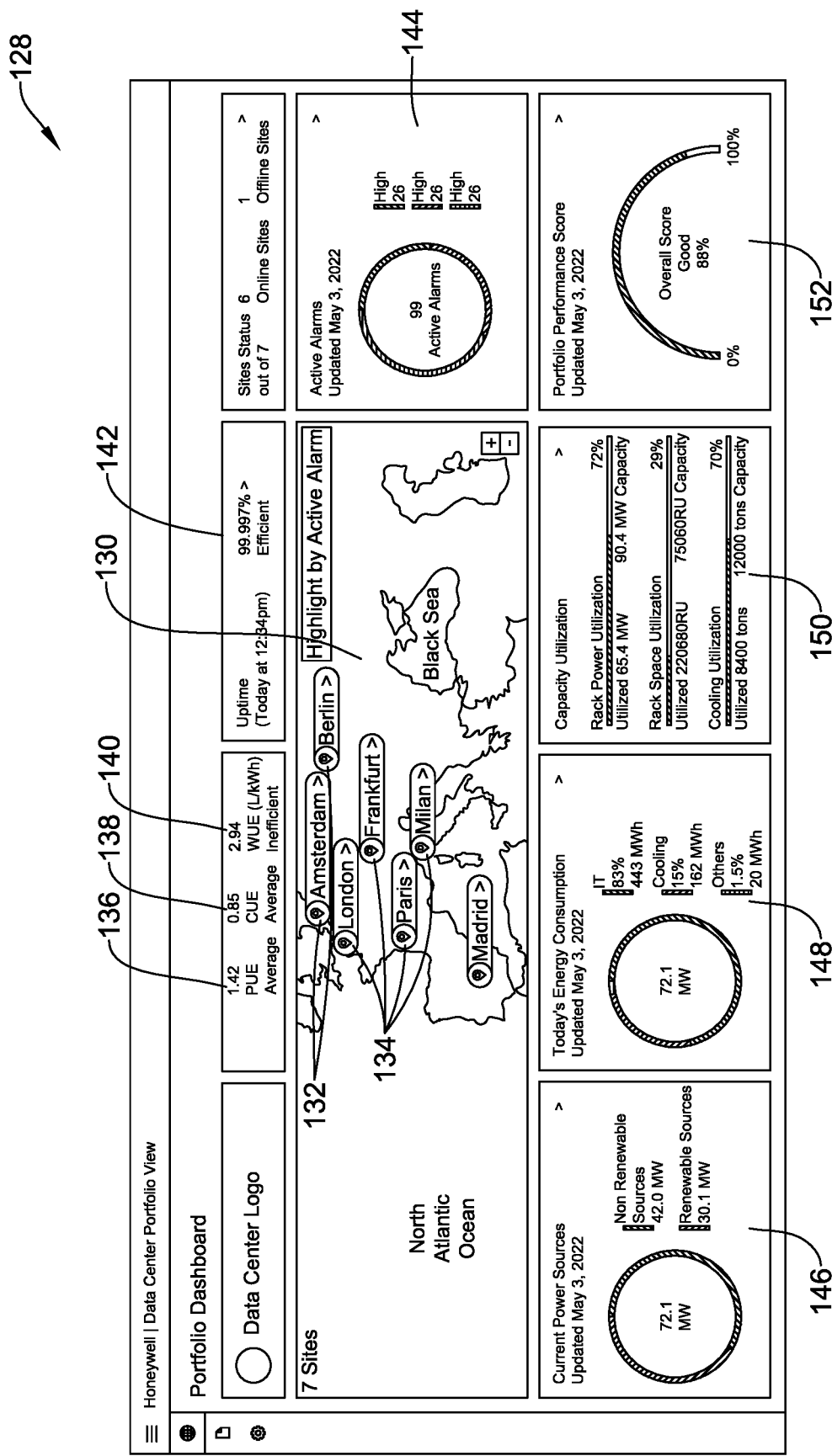
FIG. 6 shows a dashboard that may be generated and displayed by the illustrative monitoring system of FIG. 1.

FIG. 6 shows a dashboard 128 that may be generated and displayed by the monitoring system 12. The dashboard 128 provides portfolio-level information, which may encompass a plurality of different data centers. A map 130 provides a geographical location for each of the corresponding data centers, and includes icons indicating each location. In some cases, the map 130 may include icons 132 that are a different color, or otherwise visually different, in order to indicate locations that are not performing as well. Locations that are performing well may be indicated by icons 134. The illustrative dashboard 128 shows an overall PUE score 136, an overall CUE score 138 and an overall WUE score 140 aggregated across the plurality of different data centers. An overall Uptime Score 142 aggregated across the plurality of different data centers is also shown.

The illustrative dashboard 128 includes a panel 144 that includes a graphical representation of active alarms. A panel 146 includes a graphical representation of current power sources, broken out into renewable and non-renewable sources, a panel 148 includes a graphical representation of today's energy consumption, broken out into IT, cooling and others, and a panel 150 showing server rack capacity utilization. A panel 152 in the lower right provides a graphical representation of an overall portfolio-level performance score.

Figure 7:
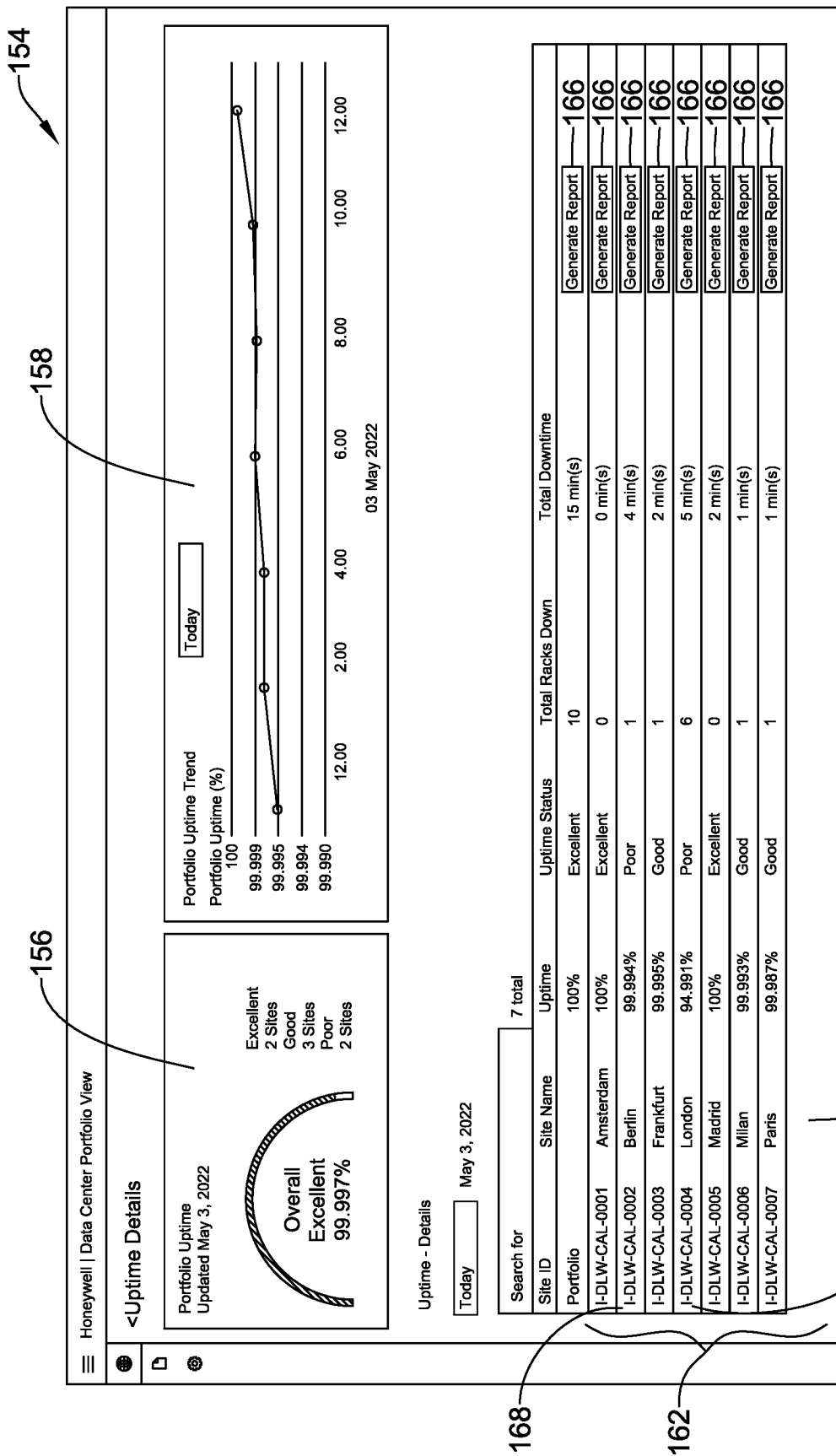
FIG. 7 shows a dashboard that may be generated and displayed by the illustrative monitoring system of FIG. 1.

FIG. 7 shows a dashboard 154 that may be generated and displayed by the monitoring system 12. The illustrative dashboard 154 includes additional details, at a portfolio level, for uptime status. A panel 156 includes a graphical representation of an overall uptime status, including a listing of how many sites currently have an excellent uptime status, a good uptime status or a poor uptime status. It will be appreciated that other descriptors may also be used. A panel 158 includes a graphical representation showing trends within the uptime status over a given period of time, which in this example is for today. In some cases, the period of time may be selected by a user. A panel 160 includes a listing 162 that shows uptime status for each of the sites within the portfolio. As an example, a row 164, which corresponds to London (one of the data center sites marked with an icon 132 in FIG. 6, indicating poor performance) shows an uptime score of only 94.991 percent uptime, with a POOR uptime status and a total of 6 server racks down. The listing 162 also includes a row 168 that corresponds to Berlin, which will be referenced with respect to FIG. 8. In the example shown, each of the rows within the listing 162 includes a Generate Report button 166.

FIG. 8 shows a report 170 that may be generated and displayed by the monitoring system 12. The report 170 provides additional information regarding the Berlin data center location, and may be accessed by pressing the Generate Report button 166 corresponding to the row 168 in FIG. 7. The report 170 includes a column 172 showing site name, a column 174 including location, a column 176 including rack name, a column 178 showing total downtime, a column 180 showing when the downtime began and a column 182 showing when the downtime ended. The report 170 includes a summary section 184. While shown as a spreadsheet, it will be appreciated that the illustrated report could be displayed in other formats, as desired.

Figure 9A:
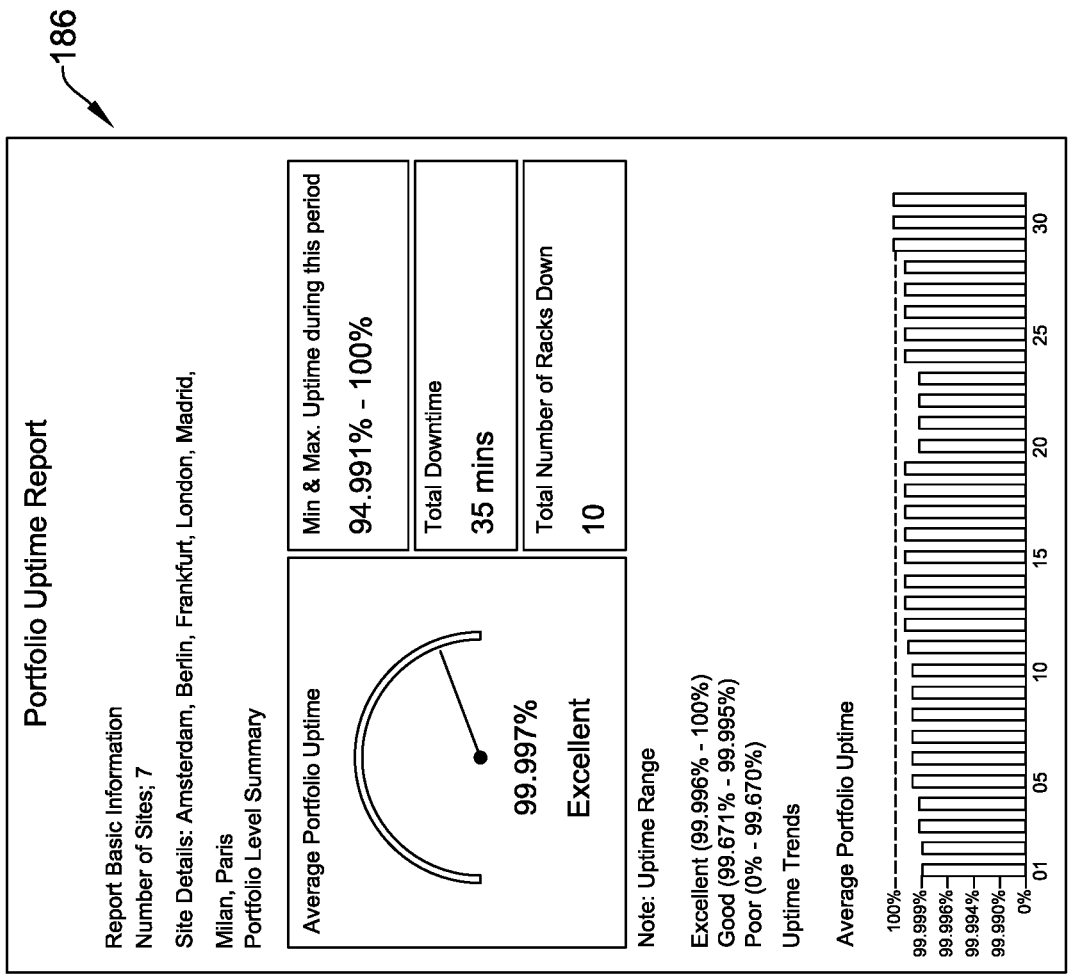
FIGS. 9A, 9B and 9C show reports that may be generated and printed out by the illustrative monitoring system of FIG. 1.
Figure 9B:
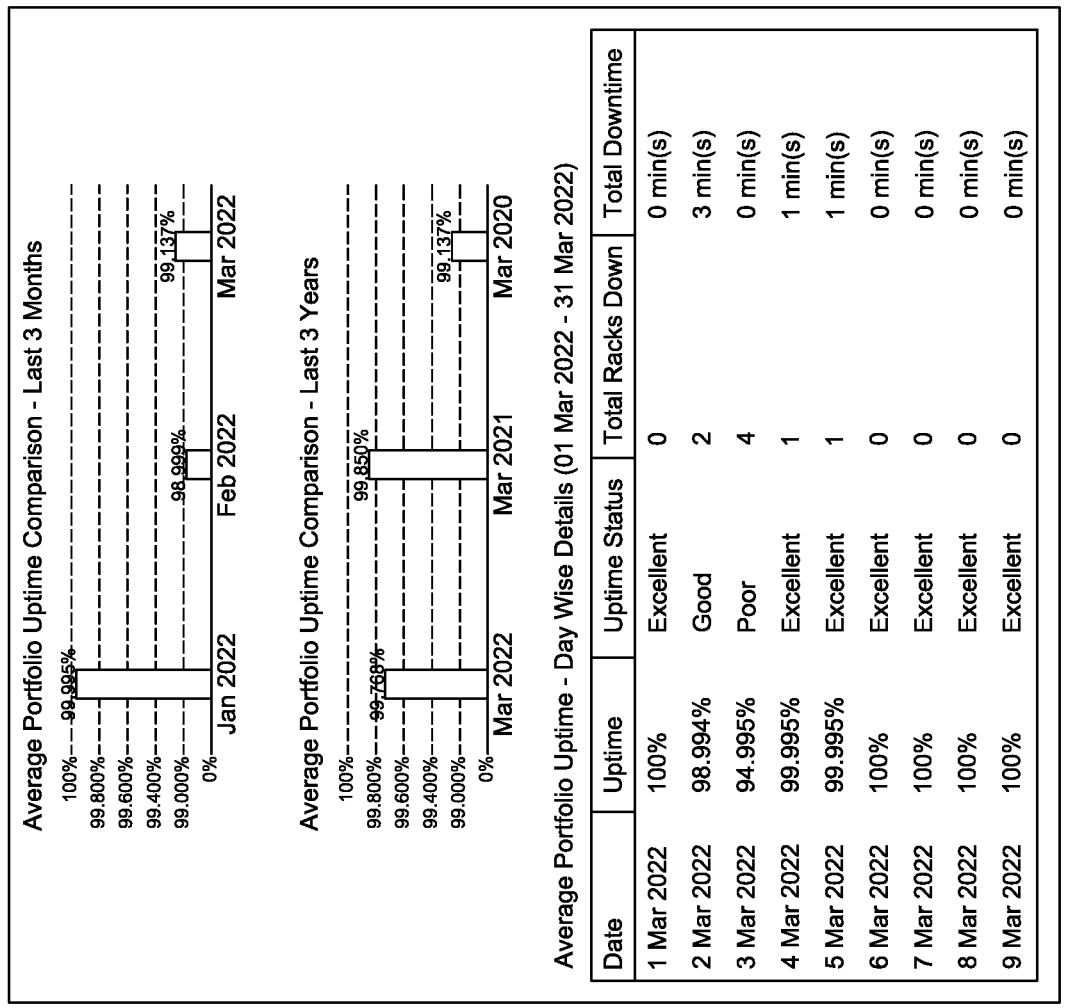
Figure 9C:

FIGS. 9A, 9B and 9C are reports that may be generated and printed and/or displayed by the monitoring system 12. FIG. 9A shows a report 186, FIG. 9B shows a report 188 and FIG. 9C shows a report 190. These are just illustrative, as each of the reports 186, 188 and 190 may include additional information, or may exclude some information that is currently shown. These portfolio-level uptime reports may be generated for any desired time period. Sometimes the desired time period is user selected. In some cases, similar reports may be generated for other performance parameters such as but not limited to PUE performance, CUE performance, WUE performance and alarm performance.

Figure 10:
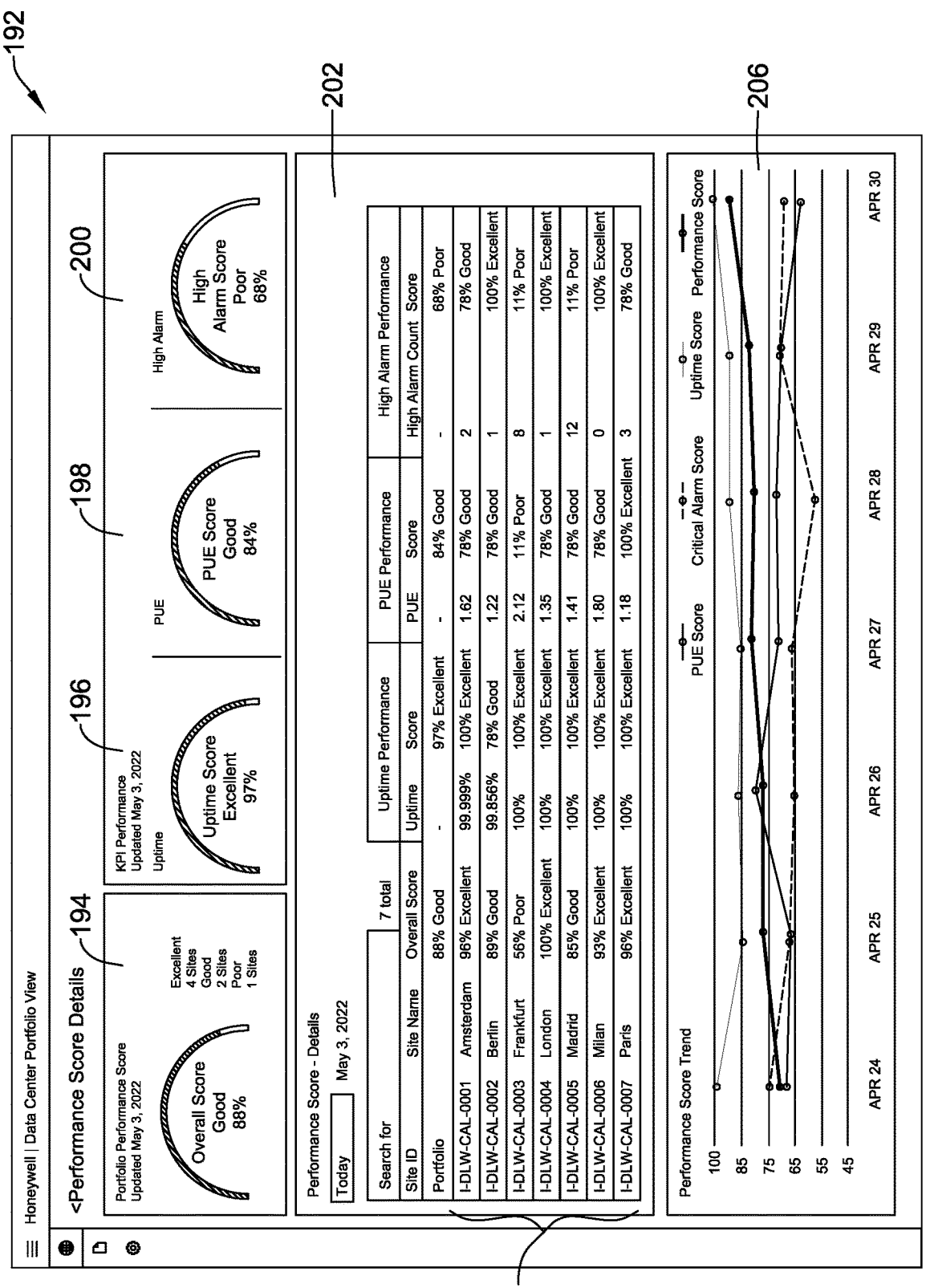
FIG. 10 shows a dashboard that may be generated and displayed by the illustrative monitoring system of FIG. 1.

FIG. 10 shows a dashboard 192 that may be generated and displayed by the illustrative monitoring system of FIG. 1. The dashboard 192 provides additional details regarding the uptime status, the PUE performance and the high alarm performance, which in this example are the factors used in calculating the overall portfolio performance score (such as via the calculations described with respect to the spreadsheet 62 shown in FIGS. 5A, 5B, 5C and 5D). The dashboard 192 includes a panel 194 that includes a graphical representation of the overall portfolio performance score. A panel 196 includes a graphical representation of the overall portfolio-level uptime status. A panel 198 includes a graphical representation of the overall PUE score. A panel 200 includes a graphical representation of the overall portfolio-level high alarm performance. A panel 202 includes a listing 204 showing the overall performance score, the uptime status, the PUE performance and the high alarm performance for each of the data center sites. In some cases, a user may be able to add or remove KPIs (key performance indicators) from display and/or from calculation of the overall performance score. For example, a user may add CUE performance and/or WUE performance, along with corresponding weights, to the calculation of the overall performance score. A panel 206 provides a trend graph of one or more of the factors (e.g. the uptime status, the PUE performance and the high alarm performance) used in determining the overall performance score.

Those skilled in the art will recognize that the present disclosure may be manifested in a variety of forms other than the specific embodiments described and contemplated herein. Accordingly, departure in form and detail may be made without departing from the scope and spirit of the present disclosure as described in the appended claims.

What is claimed is:

1. A system for monitoring performance of a data center, the data center including a plurality of server racks, each of the plurality of server racks including one or more power supply units configured to provide power to the respective server rack, the system comprising:
    an input port for receiving signals representative of a plurality of operating conditions of the data center, the plurality of operating conditions including a quality of power that is made available by one or more of the power supply units for each of the respective plurality of server racks of the data center;
    a user interface including a display;
    a controller operably coupled with the input port and the user interface, the controller configured to:
        receive signals over time via the input port representative of the plurality of operating conditions of the data center;
        for each of the plurality of server racks, determine when the quality of power that is made available by the respective one or more power supply units falls outside of a predefined power quality criteria;
        for each of the plurality of server racks, determine an amount of time that the quality of power that is made available by the respective one or more power supply units remains outside of the predefined power quality criteria;
        determine an uptime status of the data center based at least in part on an aggregate of the amount of time that the quality of power made available by the respective one or more power supply units for each of the plurality of server racks remains outside of the predefined power quality criteria aggregated over the plurality of server racks; and
        display a dashboard on the display, the dashboard displaying the uptime status of the data center.

2. The system of claim 1, wherein the controller is configured to:
    receive a user input via the user interface that requests one or more maintenance tasks be performed to improve the uptime status of the data center; and
    in response to the user input, send one or more maintenance requests to maintenance personnel to improve the uptime status of the data center.

3. The system of claim 1, wherein the controller is configured to:
    determine an amount of time that the quality of power that is made available by the respective one or more power supply units for each of the plurality of server racks is within the predefined power quality criteria aggregated over the plurality of server racks; and
    wherein the uptime status is expressed as a percentage of time that the quality of power that is made available by the respective one or more power supply units for each of the plurality of server racks is within the predefined power quality criteria aggregated over the plurality of server racks.

4. The system of claim 1, wherein the controller is configured to:
    classify the uptime status into a selected performance category of three or more performance categories, wherein each of the three or more performance categories represent a different performance level of the data center; and
    display on the display the selected performance category concurrently with the uptime status.

5. The system of claim 1, wherein the controller is configured to:
    receive a user input via the user interface identifying a selected time period; and determine the uptime status of the data center for the selected time period based at least in part on an aggregate of the amount of time during the selected time period that the quality of power that is made available by the respective one or more power supply units for each of the plurality of server racks remains outside of the predefined power quality criteria aggregated over the plurality of server racks of the data center.

6. The system of claim 1, wherein the controller is configured to:
determine the uptime status of the data center during each of a plurality of time intervals; and
concurrently display on the display the determined uptime status of the data center for each of the plurality of time intervals.

7. The system of claim 1, wherein the controller is configured to:
display on the display the aggregate of the amount of time that the quality of power that is made available by the respective one or more power supply units for each of the plurality of server racks remains outside of the predefined power quality criteria aggregated over the plurality of server racks of the data center; and
display how many of the plurality of server racks of the data center had the quality of power made available by the respective one or more power supply units fall outside of the predefined power quality criteria.

8. The system of claim 1, wherein the controller is configured to:
display on the display an identifier of each of the plurality of server racks of the data center that had the quality of power made available by the respective one or more power supply units fall outside of the predefined power quality criteria along with the amount of time that the quality of power for the respective server rack was outside of the predefined power quality criteria.

9. The system of claim 1, wherein the controller is configured to:
identify a Power Utilization Effectiveness (PUE) of the data center;
determine a performance score for the data center, wherein the performance score is based at least in part on a weighted sum of the uptime status of the data center and the PUE of the data center; and
display the performance score for the data center on the display.

10. The system of claim 9, wherein the controller is configured to:
identify a number of occurrences of predetermined alarms associated with the data center; and
wherein the performance score for the data center is based at least in part on a weighted sum of the uptime status of the data center, the PUE of the data center and the number of occurrences of the predetermined alarms associated with the data center.

11. The system of claim 9, wherein the controller is configured to:
send one or more control signals to the data center to improve the uptime status of the data center and/or the performance score of the data center.

12. A method of monitoring performance of a data center using a computing device, the data center including a plurality of server racks, each of the plurality of server racks including one or more power supply units configured to provide power to the respective server rack, the method comprising:
the computing device receiving signals representative of a plurality of operating conditions of the data center, the plurality of operating conditions including a quality of power that is made available by one or more of the power supply units for each of the respective plurality of server racks of the data center;
the computing device determining an uptime status of the data center based at least in part upon an aggregate of an amount of time that the quality of power made available by the respective one or more power supply units for each of the plurality of server racks remains outside of a predefined power quality criteria aggregated over the plurality of server racks;
the computing device determining one or more performance parameters based at least in part upon some of the signals representative of the plurality of operating conditions of the data center;
the computing device determining an overall performance score for the data center, wherein the overall performance score is based at least in part upon the uptime status of the data center and one or more of the performance parameters; and
the computing device generating a dashboard displayable on a display, the dashboard displaying the uptime status of the data center and/or the overall performance score for the data center.

13. The method of claim 12, wherein at least one of the one or more performance parameters comprise one or more of a PUE (Power Utilization Efficiency) parameter, a CUE (Carbon Utilization Efficiency) parameter and a WUE (Water Utilization Efficiency) parameter.

14. The method of claim 12, wherein at least one of the one or more performance parameters comprise an alarm parameter that is representative of a number of occurrences of one or more predetermined alarms associated with the data center.

15. The method of claim 12, further comprising:
the computing device accepting an input indicating a user-selected time period;
the computing device determining the uptime status for the user-selected time period based at least in part upon an aggregate of the amount of time that the quality of power made available by the respective one or more power supply units for each of the plurality of server racks remains outside of the predefined power quality criteria aggregated over the plurality of server racks during the user-selected time period;
the computing device determining the one or more performance parameters for the user-selected time period based at least in part upon some of the signals representative of the plurality of operating conditions of the data center occurring during the user-selected time period;
the computing device determining the overall performance score for the user-selected time period based at least in part upon the uptime status for the user-selected time period and one or more of the performance parameters for the user-selected time period; and
the computing device updating the generated dashboard to display the uptime status for the user-selected time period and the overall performance score for the user-selected time period.

16. The method of claim 12, further comprising the computing device displaying at least one of the one or more performance parameters on the dashboard.

17. A non-transitory, computer-readable storage medium having executable instructions stored thereon that when executed by one or more processors, cause the one or more processors to:
- receive signals representative of a plurality of operating conditions of a data center;
- determine an uptime status for the data center based at least in part upon a quality of power that is made available by respective one or more power supply units for each of a plurality of server racks of the data center remaining within a predefined power quality criteria;
- determine one or more performance parameters based at least in part upon some of the signals representative of the plurality of operating conditions of the data center;
- determine an overall performance score for the data center, the overall performance score is based at least in part upon the uptime status of the data center and one or more of the performance parameters; and
- generate a dashboard displayable on a display, the dashboard displaying the uptime status of the data center and the overall performance score for the data center.

18. The non-transitory, computer-readable storage medium of claim 17, wherein at least one of the one or more performance parameters comprise one or more of a PUE (Power Utilization Efficiency) parameter, a CUE (Carbon Utilization Efficiency) parameter, a WUE (Water Utilization Efficiency) parameter and an alarm parameter.

19. The non-transitory, computer-readable storage medium of claim 17, wherein the one or more processors are further caused to:
- receive a user input that requests one or more maintenance tasks be performed to improve the uptime status of the data center and/or the overall performance score of the data center; and
- in response to the user input, send one or more maintenance requests to maintenance personnel to improve the uptime status of the data center and/or the overall performance score of the data center.

20. The non-transitory, computer-readable storage medium of claim 17, wherein the one or more processors are further caused to display at least one of the one or more performance parameters on the dashboard in addition to the uptime status of the data center and the overall performance score for the data center.

* * * * *